United States Patent [19]
Bayer et al.

[11] Patent Number: 4,609,293
[45] Date of Patent: Sep. 2, 1986

[54] LUBRICATION FEED BUSHING FOR ANTI-FRICTION BEARINGS

[75] Inventors: Oswald Bayer, Aidhausen; Martin Grehn, Dittelbrunn; Edwin Hey, Elfershausen; Hans-Karl Lorösch, Gochsheim; Walter Vogel, Schweinfurt, all of Fed. Rep. of Germany

[73] Assignee: FAG Kugelfischer Georg Schafer (KGaA), Fed. Rep. of Germany

[21] Appl. No.: 604,059

[22] Filed: Apr. 26, 1984

[30] Foreign Application Priority Data

Apr. 29, 1983 [DE] Fed. Rep. of Germany ....... 3315644

[51] Int. Cl.$^4$ ............................................. F16C 33/66
[52] U.S. Cl. .................................... 384/469; 384/473; 384/475; 384/286
[58] Field of Search ............... 308/187, 189 R, 207 R; 384/286, 287, 289, 290, 322, 397, 462, 469, 473, 474, 475

[56] References Cited

U.S. PATENT DOCUMENTS

| | | | |
|---|---|---|---|
| 2,001,823 | 5/1935 | Knowlton | 384/287 |
| 3,424,273 | 1/1969 | Carlson et al. | 184/98 |
| 3,730,599 | 5/1973 | Fingerle | 384/475 |
| 4,472,004 | 9/1984 | Fingerle et al. | 384/286 X |

FOREIGN PATENT DOCUMENTS 268034 3/1927 United Kingdom .
1357175 6/1975 United Kingdom .

Primary Examiner—Stuart S. Levy
Assistant Examiner—David Werner
Attorney, Agent, or Firm—Ostrolenk, Faber, Gerb & Soffen

[57] ABSTRACT

The disclosure concerns an anti-friction bearing between a rotating shaft and an external bushing. The bearing includes two axially spaced apart rows of bearing balls. A feed bushing is disposed in the space between the shaft and the external bushing and between the two rows of bearings. The feed bushing is open at the axial ends for dispensing lubricant to the rows of bearings at the axial ends of the feed bushing. The feed bushing holds lubricant, such as grease, in itself for being dispensed at the axial ends of the feed bushing. A porous elastic material may be disposed in the feed bushing for being impregnated with the lubricant. The feed bushing, and also the porous material if used, are elastic and resilient to permit deflection of the shaft with respect to the external bushing. Various shape and configuration feed bushings are disclosed. A lubricant recharging hole passes through the external bushing and communicates to the feed bushing.

2 Claims, 9 Drawing Figures

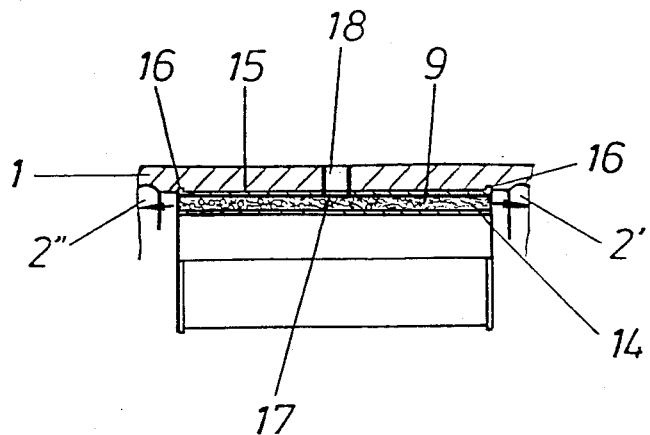
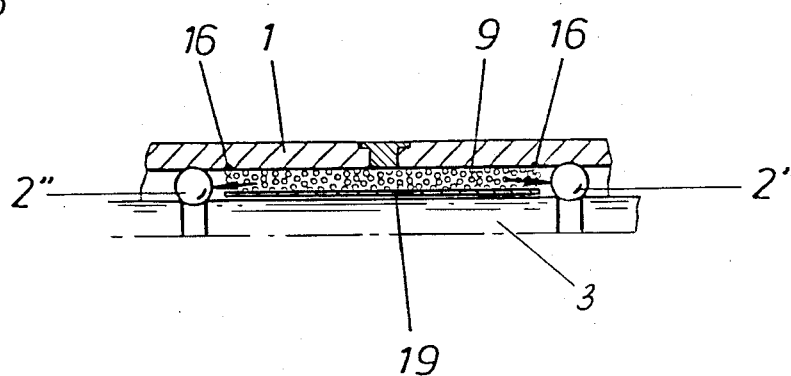
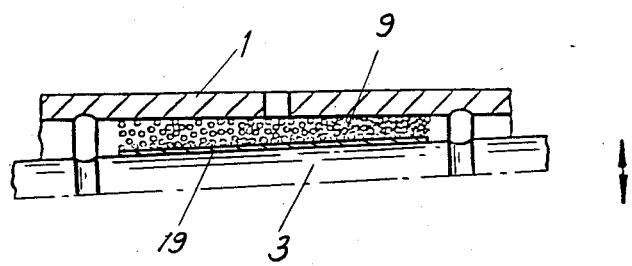
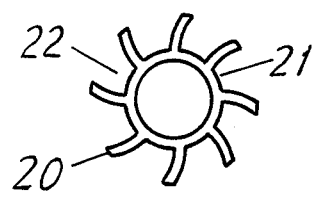
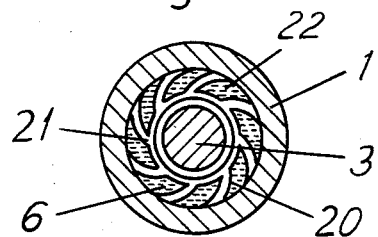

LUBRICATION FEED BUSHING FOR ANTI-FRICTION BEARINGS

BACKGROUND OF THE INVENTION

The present invention relates to lubrication of an anti-friction bearing and particularly to a feed bushing which is adapted to receive a supply of lubricant or grease and is disposed axially between two rows of anti-friction bearing ball elements and radially between a bearing bushing and a shaft inside that bearing bushing. The invention has particular application to double row anti-friction bearings with two axially spaced rows of balls.

To assure dependable operation of anti-friction bearings, various greases and oils are used for their lubrication. For single-row bearings, lifetime lubrication is frequently employed, especially when the bearing is covered on both sides. For readily accessible bearings, relubrication from the outside, via or grease nipples, or the like, is effected at certain intervals.

In double-row bearings in which the shaft at the same time forms the inner bearing ring and in which the external bearing bushing forms the outer ring or in which there are installed outer rings, suitable relubrication or lifetime lubrication is possible only at great expense, and, because of the small amount of space required, such lubrication is done only with complicted devices.

Certain bearing lubricating devices are known which use grease supply bushings. For instance, German Utility Model DE-Gbm No. 19 26 519 mentions a porous intermediate bushing (of sintered material, or the like). Before that bushing is installed, it is impregnated with the base oil or the grease used. The impregnation is done in a vacuum. Such bushings are used predominantly as plain bushings with emergency operating properties. Another disadvantage is that, as a result of the stream of air caused by the rotating shaft, particles of oil detach themselves from the sintered bushing, and the entire bearing space is wetted. There is no possibility of directed lubrication.

In German Provisional Patent DE-AS No. 23 34 186, a supplementary lubricating device is proposed which, with compact construction, forms a storage space. The additional lubricating results from centrifugal force only upon the rotation of the complete bearing package. In addition to the high expense of this device, high speeds of rotation cannot be reached with rotating outer rings due to the large masses in rotation. The lubricating device can, therefore, be used only in connection with particularly slow running devices.

In German Utility Model DE-Gbm No. 72 38 730, an additional lubricating chamber is described which is intended predominantly for idling wheels of rail vehicles. In this case, as already described in German Provisional Patent No. 23 34 186, the outer ring of the bearing rotates. In addition to the high expense which such a chamber causes, it is also not possible in this case to provide directed additional lubrication of the bearing. Holes are introduced axially into the closure covers and radially into the surrounding bushing and are intended to permit the emergence of the oil. They extend over the entire space surrounding the bearing. The holes must be filled before any drop of oil reaches the bearing.

Furthermore, previously known feed bushings for ball bearings in which the races are arranged directly in the shaft or in the external bearing bushing make the introduction of the rolling element balls into the races difficult. This is because there is a small amount of space between the shaft and the bearing bushing within which the feed bushing is also arranged. As a result, extensive deflection of the shaft is not possible for installing the balls.

SUMMARY OF THE INVENTION

The object of the present invention is, therefore, to avoid the disadvantages pointed out above and to provide a lubricating device of the aforementioned type which, while of compact construction, assures directed lubrication of the bearing and facilitates the assembling of the bearing.

Another object of the invention is to direct lubricant to the rows of rolling elements, which rows are spaced apart.

A further object of the invention is to not interfere with deflection of the shaft with respect to the external bushing.

According to the invention, and particularly in a two-row, high-speed anti-friction ball bearing, there is a central shaft which is surrounded by a radially spaced away external bushing or bearing housing. The shaft and the external bushing around the shaft respectively define the opposed inner and outer raceways for the bearing balls. There are two axially spaced apart rows of bearing balls which ride in the raceways on the shaft and inside the external bushing.

A lubrication feed bushing is disposed in the radial space between the shaft and the external bushing or bearing housing around the shaft. The lubrication feed bushing is disposed axially between the two rows of balls. The feed bushing is adapted to receive a supply of lubricant, and particularly a supply a grease. According to the invention, the feed bushing has flexibility and resilience, particularly in the radial direction of the bearing, so that the shaft may be deflected with respect to the external bushing, particularly at the time of loading of the balls in the raceways. In addition, the lubrication feed bushing is open only at its axial ends in the directions toward the two axially spaced apart rows of balls for delivering lubrication unimpeded to the two rows. The design of the feed bushing also is intended to prevent delivery of lubricant elsewhere along the axial length of the feed bushing.

The feed bushing may have in it a body of a porous elastic material, which has a desired radial resilience and is adapted to be impregnated with grease or base oil. The feed bushing itself, whether or not it is filled with a porous elastic material, is comprised of resilient material which contains the lubricant and which permits the exit of lubricant at the axial ends of the feed bushing to the rows of balls. The resilient material of the feed bushing could be plastic or spring steel. The resilient material of the bushing and/or the fact that it is filled with a porous elastic material permits the radial deflection of the shaft in the external bushing which facilitates the loading of the balls in the raceways of the bearing.

As a result of the resilient design of the feed bushing as well as of the elastic porous mass adapted to receive the base oil, it is possible to deflect the shaft radially with respect to the external bushing during the installation of the rows of balls. The elastic elements simply yield.

There may be a hole through the external bushing and communicating into the feed bushing for delivery through the hole to the feed bushing of additional base oil, grease or the like lubricant. After the assembling of the bearing, base oil or the grease used for the lubricating of the bearing may be introduced into the porous mass via a radial hole in the bearing housing. The oil diffuses toward the axial openings and is thus brought directly to the rows of balls.

In various embodiments, the feed bushing may have a general U-shape or a trapezoidal shape, viewed in a cross-section through the axis of the bearing.

In other embodiments, elastically developed feed bushings are firmly attached to a material which is also elastic but porous. The axial securing is effected by an annular bead, which engages in the bearing housing.

In one specific embodiment, for example, the feed bushing is comprised of two concentric, radially spaced apart bushings, with a porous elastic material layer between them which is adapted to receive base oil. A bead on at least one and particularly the outer one of the two radially spaced bushings is received in a corresponding groove in the external bushing for holding the lubrication feed bushing in place. Other configurations using a securement bead for securing the feed bushing to the external bushing around the bearing may be provided.

Since the base oil settles out in the grease when at rest, the grease is arranged in a non-rotating feed bushing within the bearing bushing to facilitate settling. In order to obtain directed additional lubricating of the bearing points in question, openings are provided on the ends of the feed bushing. As a result of the heat which is necessarily produced and the vibrations which naturally occur and to which every bearing is subject, the base oil finds its way to the rows of bearings via the openings on the ends of the feed bushing.

The invention assures uncomplicated directed additional lubrication, which can serve as long-life lubrication. It can also serve as an additional lubrication device via the radial hole introduced into the bearing housing. This assures a long life and high speeds of rotation of the bearing. The economy of the simple and compact construction is obvious.

BRIEF DESCRIPTION OF THE DRAWINGS

FIG. 5 is another partially broken away, partially cross-sectional view of a fourth embodiment of a feed bushing according to the invention;

FIG. 6 is another partially broken away, partially cross-sectional view of a fifth embodiment of a feed bushing according to the invention;

FIG. 7 shows the embodiment of FIG. 6 with the shaft inclined with respect to the external bushing, which is permitted by the design of the feed bushing between them;

FIG. 8 shows the feed bushing of a sixth embodiment of the invention, with the feed bushing in its unassembled condition; and FIG. 9 shows the feed bushing of FIG. 8 in installed condition in a view across the axis of the bearing provided with the feed bushing.

DESCRIPTION OF THE PREFERRED EMBODIMENTS

Figure 1:
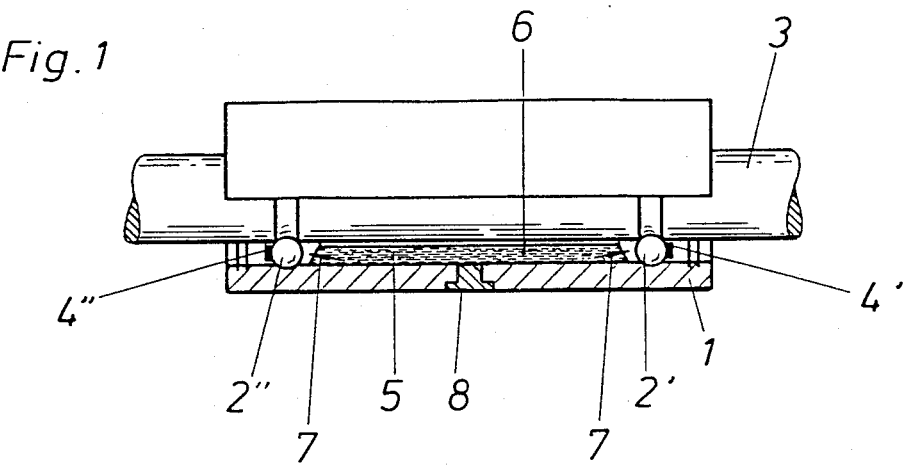
FIG. 1 is a partially broken away, partially cross-sectional side view of a double row ball bearing on a shaft and provided with a first feed bushing embodiment according to the invention.

FIG. 1 shows a ball bearing in which the external bearing bushing 1 receives within it the two axially spaced rows of balls 2' and 2". The balls ride in respective axially spaced apart, circumferential, inner races defined in the shaft 3. The respective cages 4' and 4" guide and space the balls 2', 2" in their races.

A springy material feed bushing 5, which is filled with grease 6, is arranged in the axial space between the two rows of balls 2' and 2" and in the radial space between the external bushing 1 and the shaft 3. The emergence of the base oil from the grease 6 can take place only in the axial direction toward the two bearing rows 2' and 2", through the openings at the axial ends of the bushing 5 in the outward directions indicated by the arrows 7. The material of the feed bushing permits energence of oil outwardly of the bushing 5. The bushing 5 is trapezoidal in cross-section.

The radially oriented relubrication hole 8 in the bushing 1 through which more grease may be supplied to bushing 5 is provided with a closure.

Figure 2:
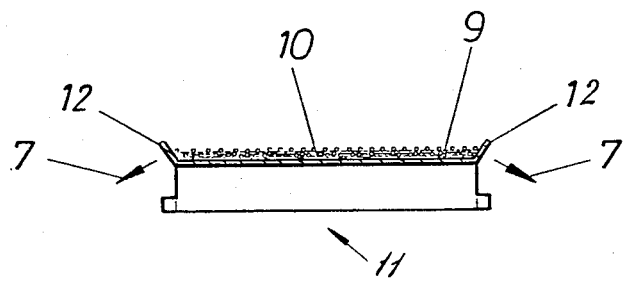
FIG. 2 is a side view showing only a second embodiment of feed bushing according to the invention.
Figure 3:
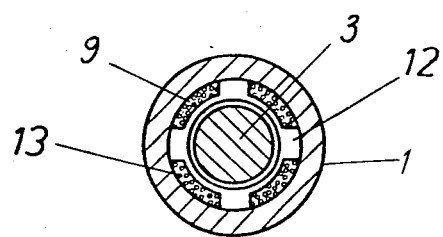
FIG. 3 is an end view inboard of the row of rollers of a bearing, with the feed bushing embodiment of FIG. 2 in place.

FIG. 2 shows a second feed bushing 11 of resilient material into which a porous elastic mass 9 is introduced. The bushing 11 is a tube having four prongs 12 spaced around each of its opposite ends. The prongs are inclined and project outwardly. FIG. 3 shows such bushing mounted in place in a bearing. The prongs 12 rest against the outer race and position the feed bushings. The porous mass 9 is disposed around the whole bushing 11 between the two sets of prongs. The base oil 10 is impregnated into the porous mass, rather than sitting in the bushing. The oil moves onto the rows of bearings through the openings at the axial ends of the bushing, in the directions indicated by the arrows. The bushing 11 has a U-shaped cross-section.

Figure 4:
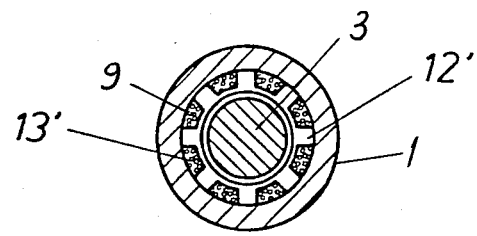
FIG. 4 is the same type of view as FIG. 3, showing third feed bushing embodiment according to the invention.

FIGS. 3 and 4 show two advantageous feed bushing developments including respective prongs 12 and 12' and respective passage openings 13, 13' between adjacent prongs, which allow the base oil to arrive at the rows of balls.

FIG. 5 shows another illustrative embodiment of a feed bushing. It comprises a porous elastic mass which is introduced between two radially separated elastic bushings 14 and 15. The bushing 15 carries respective annular beads 16 on its exterior axial ends. These engage into grooves in the bearing external bushing 1. The external bushing 15 is provided with a radial opening 17 through which the base oil is introduced, through the hole 18 in the bearing bushing 1. Since this spring feed bushing is open at its axial ends, the base oil can reach the rows of bearings 2' and 2" unimpeded and in directed manner.

FIG. 6 shows another embodiment in which the bushing 19 of elastic material is firmly connected to the material 9 for receiving the base oil, which is also elastic and furthermore porous. The axial holding-fast of the resulting feed bushing is effected via annular beads 16 on the material 9 which are received in grooves of the external bearing bushing 1. The base oil can emerge unimpeded axially in the directions of the bearing rows 2' and 2".

FIG. 7 shows the possibility of inclining the shaft 3 of the embodiment of FIG. 6, for example, in order to facilitate the insertion of the balls, as in U.S. Pat. No. 4,508,397 filed May 5, 1983.

FIG. 8 shows another possible embodiment of the feed bushing, in an unassembled condition. Around the elastic annular body 21, elastic spoke-like struts 20 are formed, which extend over the entire axial length of the annular body 21. They form the chambers 22 to receive the grease.

FIG. 9 shows the feed brushing of FIG. 8 in the installed condition. The spoke-like struts 20 deflect and adapt themselves to the inside diameter of the bearing bushing 1. The grease 6 is introduced in the chambers 22. The chambers 22 are open in the axial direction so that the base oil in this case also reaches the rows of bearings unimpeded.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A lubricating device for an anti-friction bearing on a shaft, wherein the bearing includes a shaft, an external bushing around the shaft and radially spaced therefrom and two circumferential rows of bearing balls which can roll around the shaft and which are axially spaced apart along the shaft;

a lubrication feed bushing disposed in the radial space between the shaft and the external bushing and in the axial space between the two rows of balls; the feed bushing being adapted to receive a supply of lubricant; the feed bushing having openings at the axial ends thereof toward the two rows of balls between which the feed bushing is disposed, so that the feed bushing delivers lubricant therein only at its ends in the direction toward the rows of balls; the feed bushing being resilient for permitting the shaft to be deflected with respect to the external bushing;

the feed bushing being comprised of two bushings of resilient material which are radially spaced apart, one closer to the shaft and the other closer to the external bushing, and the two elastic bushings are connected for defining the feed bushing; and further comprising a material which is elastic and porous for receiving and holding and dispensing lubricant and which is disposed between the radially inner and radially outer bushings of the feed bushing.

2. The lubricating device of claim 1, further comprising a bead on the feed bushing outer bushing for engaging the external bushing of the bearing for axial securement of the feed bushing.

* * * * *